(12) United States Patent
Coretto et al.

(10) Patent No.: US 10,677,658 B2
(45) Date of Patent: Jun. 9, 2020

(54) RETAINING SYSTEMS AND METHODS

(71) Applicant: Hamilton Sundstrand Corporation, Charlotte, NC (US)

(72) Inventors: August M. Coretto, Manchester, CT (US); Aaron F. Rickis, Feeding Hills, MA (US); Jorge Luis Vega, Bloomfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 457 days.

(21) Appl. No.: 15/257,128

(22) Filed: Sep. 6, 2016

(65) Prior Publication Data

US 2018/0066997 A1  Mar. 8, 2018

(51) Int. Cl.
*G01K 1/08* (2006.01)
*G01N 27/407* (2006.01)
(Continued)

(52) U.S. Cl.
CPC .............. *G01K 1/08* (2013.01); *G01D 11/00* (2013.01); *G01D 11/24* (2013.01); *G01D 11/245* (2013.01); *G01D 11/30* (2013.01); *G01K 1/14* (2013.01); *G01K 7/02* (2013.01); *G01K 7/16* (2013.01); *G01L 1/26* (2013.01); *G01L 19/14* (2013.01); *G01L 19/142* (2013.01); *G01L 19/143* (2013.01); *G01L 19/147* (2013.01); *G01N 27/4078* (2013.01); *G01N 29/225* (2013.01); *G01N 2001/2285* (2013.01)

(58) Field of Classification Search
CPC ...... G01D 11/245; G01D 11/30; G01D 11/24; G01D 11/00; G01L 19/14; G01L 19/147; G01L 19/142; G01L 19/143; G01L 1/26; G01K 1/08; G01K 1/14; G01N 27/4078; G01N 29/225; G01N 2001/2285
USPC ......... 374/208–210, 163, 179; 73/431, 866.5
See application file for complete search history.

(56) References Cited

U.S. PATENT DOCUMENTS 3,745,828 A * 7/1973 Howell .................. B22D 2/006
                                                       73/295
3,832,669 A * 8/1974 Mueller .................... G01K 7/42
                                                      206/306

(Continued)

FOREIGN PATENT DOCUMENTS

WO   WO-2011/094753 A2   8/2011

OTHER PUBLICATIONS

Extended European Search Report dated Feb. 21, 2018, issued during the prosecution of European Patent Application No. EP 17189260.7 (10 pages).

*Primary Examiner* — Daniel S Larkin
*Assistant Examiner* — Anthony W Megna Fuentes
(74) *Attorney, Agent, or Firm* — Locke Lord LLP; Scott D. Wofsy; Georgi Korobanov

(57) ABSTRACT

A sensor system includes a sensor body with a proximal end and a distal end. The sensor body includes a radially extending flange positioned between the proximal end and the distal end. The radially extending flange of the sensor body includes a flange surface. A sleeve is positioned radially outward from the sensor body surrounding the proximal end of the sensor body. The sleeve has a radially extending end flange with an end surface configured to contact the flange surface of the radially extending flange of the sensor body to transfer a load between the sleeve and the sensor body.

7 Claims, 2 Drawing Sheets

(51) Int. Cl.
*G01L 19/14* (2006.01)
*G01D 11/24* (2006.01)
*G01D 11/30* (2006.01)
*G01N 29/22* (2006.01)
*G01L 1/26* (2006.01)
*G01D 11/00* (2006.01)
*G01K 7/02* (2006.01)
*G01K 1/14* (2006.01)
*G01K 7/16* (2006.01)
*G01K 1/22* (2006.01)
*G01N 1/22* (2006.01)

(56) References Cited

U.S. PATENT DOCUMENTS

| | | | | |
|---|---|---|---|---|
| 4,101,343 | A | * | 7/1978 | Feichter .................. G01K 7/08 |
| | | | | 136/221 |
| 4,127,464 | A | * | 11/1978 | Ichikawa ............. G01N 27/407 |
| | | | | 204/410 |
| 4,428,686 | A | * | 1/1984 | Brax ........................ G01K 1/14 |
| | | | | 136/230 |
| 4,786,397 | A | * | 11/1988 | Barbieri ............. G01N 27/4062 |
| | | | | 204/424 |
| 2010/0239204 | A1 | * | 9/2010 | Kaikogi ................ G01K 13/08 |
| | | | | 384/605 |
| 2013/0291645 | A1 | * | 11/2013 | Gammon .................. G01L 7/16 |
| | | | | 73/716 |
| 2015/0219502 | A1 | | 8/2015 | Lantzsch |

* cited by examiner

RETAINING SYSTEMS AND METHODS

BACKGROUND OF THE INVENTION

1. Field of the Invention

The present invention relates to retaining systems, and more particularly to retaining systems for Resistance Temperature Detectors (RTDs), for example RTDs placed in bores.

2. Description of Related Art

RTDs and other sensors are commonly placed in bores under high temperature conditions and used to measure temperature. For example, in systems using RTDs, the RTD can be retained in a given bore against vibratory loads to ensure that the sensing portion is aligned correctly with the target bore. Traditionally, this is accomplished with an uncontained cylindrical rubber sponge and seal rings, e.g. o-rings. This tends to lead to undue stress placed on the wire bundle under certain conditions, which in turn can lead to increased maintenance. Many common sensors and systems, such as RTDs, are sensitive to errors introduced due to the effects on the wire bundle, such as short circuits.

Such conventional methods and systems have generally been considered satisfactory for their intended purpose. However, there is still a need in the art for systems and methods that allow for improved sensor retaining systems. There also remains a need in the art for such systems and methods that are easy to make and use. The present invention provides a solution for these problems.

SUMMARY OF THE INVENTION

A sensor system includes a sensor body with a proximal end and a distal end. The sensor body includes a radially extending flange positioned between the proximal end and the distal end. The radially extending flange of the sensor body includes a flange surface. A sleeve is positioned radially outward from the sensor body surrounding the proximal end of the sensor body. The sleeve has a radially extending end flange with an end surface configured to contact the flange surface of the radially extending flange of the sensor body to transfer a load between the sleeve and the sensor body.

In accordance with some embodiments, the system includes a biasing component radially outward from the sleeve. The biasing component can be a pad that includes a shock absorbing material, and/or a helical spring. The biasing component can be configured to contact an axially facing outer surface of the radially extending end flange of the sleeve to apply an axial load to the sleeve. The sleeve can be configured to extend longitudinally beyond the biasing component in both directions when installed in the sensor system. The system can include an annular member radially outward from the sleeve. The biasing component can include first and second axially facing surfaces. The first axially facing surface can abut a surface of the annular member. The second axially facing surface can abut an outer axially facing surface of the radially extending end flange of the sleeve to apply an axial load to the sleeve.

The radially extending end flange of the sleeve can extend axially beyond a second end of the biasing component. The system can include a retaining member abutting at least a portion of an axial surface of the annular member to keep the annular member in place in the axial direction. The system can include a wire casing operatively connected to and extending axially from the proximal end of the sensor body to surround wires extending from the proximal end of the sensor body. Wires can extend from the proximal end of the sensor body. The wire casing can be radially outward from the wires. The wire casing can surround the wires.

In accordance with another aspect, a sensor retaining system includes a sleeve sized and configured to abut a radially extending flange of a sensor body. A biasing component is radially outward from the sleeve and configured to apply an axial load to the sleeve.

In accordance with some embodiments, the biasing component is a pad that includes a shock absorbing material, and/or a helical spring. The sleeve can be configured to extend longitudinally beyond the biasing component in both directions when installed in the sensor system. A wire casing can be nested within the sleeve, wherein at least a portion of the wire casing extends axially from the first end of the sleeve. An annular member can be positioned radially outward from the sleeve, similar to the annular member described above. A retaining member can abut at least a portion of an axial surface of the annular member, similar to the retaining member described above. A first axially facing surface of the biasing component can abut a surface of the annular member. A second axially facing surface of the biasing component can abut an outer axially facing surface of the radially extending end flange of the sleeve.

In accordance with another aspect, a method of disassembling a sensor system includes axially moving a rigid sleeve where the rigid sleeve axially abuts a portion of a sensor body positioned within a bore of a housing. The method includes axially removing a biasing member from the bore with the moving of the rigid sleeve.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods described herein without undue experimentation, preferred embodiments thereof will be described in detail herein below with reference to certain figures, wherein.

DETAILED DESCRIPTION OF THE PREFERRED EMBODIMENTS

Figure 1:
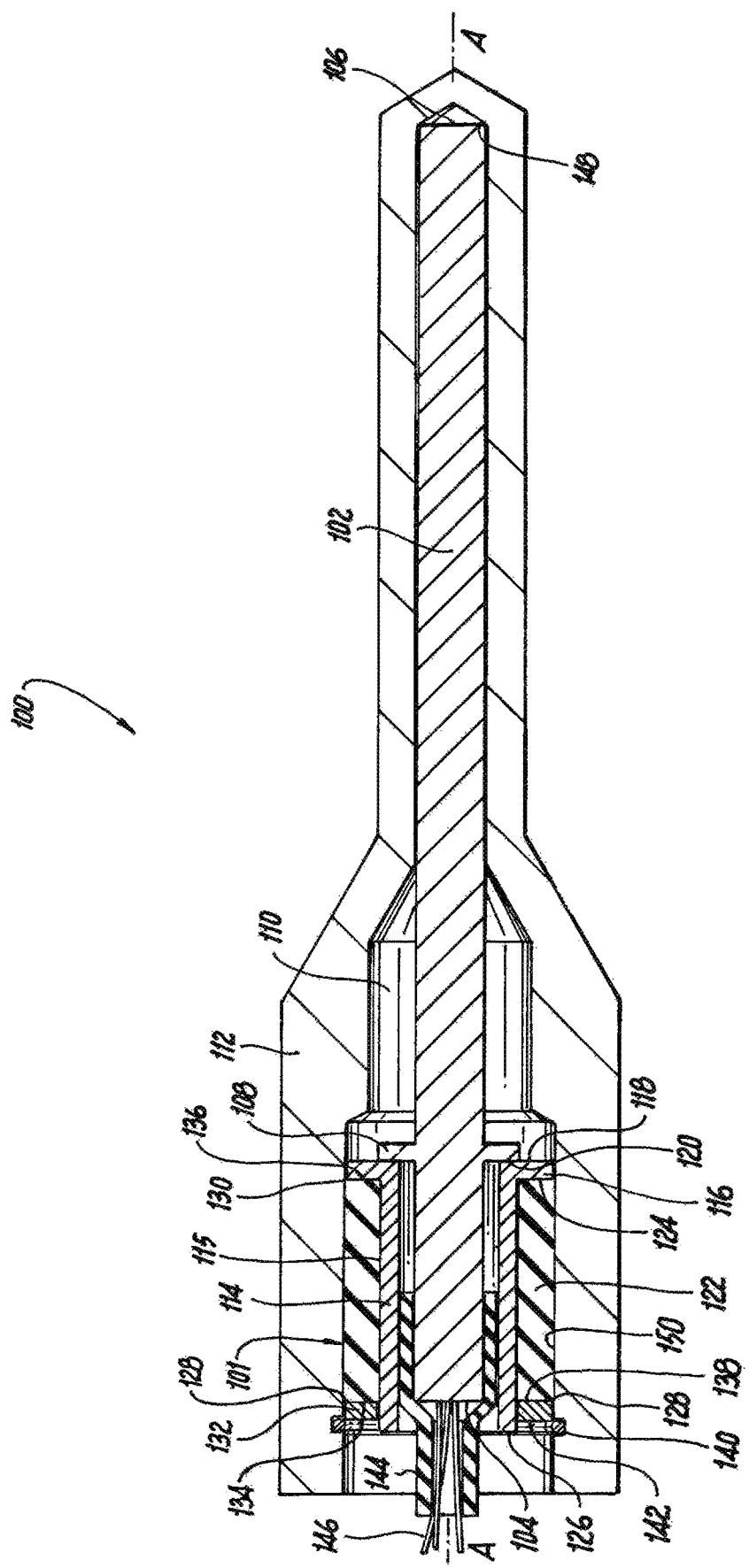
FIG. 1 is a schematic cross-sectional view of an exemplary embodiment of a sensor system constructed in accordance with the present invention, showing a sensor retaining system.

Reference will now be made to the drawings wherein like reference numerals identify similar structural features or aspects of the subject invention. For purposes of explanation and illustration, and not limitation, a partial view of an exemplary embodiment of a sensor system is shown in FIG. 1 and is designated generally by reference character 100. Other embodiments of sensor systems and methods, or aspects thereof are also shown and described with reference to FIG. 2. The systems and methods described herein can be used, for example, to retain a sensor body and reduce stress imposed on a wire bundle extending from the sensor.

As shown in FIG. 1, a sensor system 100 includes a sensor body 102 with a proximal end 104 and a second end 106. Sensor body 102 defines a longitudinal axis A between proximal and distal ends. Sensor body 102 includes a radially extending flange 108 between proximal and distal ends 104 and 106, respectively. Sensor body 102 can be an RTD sensor, thermocouple, or the like. Sensor body 102 is disposed in a bore 110 formed in a structure 112, such as a turbomachine. Sensor system 100 includes a sensor retaining system 101. Sensor retaining system 101 includes a sleeve 114 radially outward from sensor body 102 surrounding proximal end of sensor body 102. Sleeve 114 can be a rigid sleeve, e.g. a metal sleeve. System 101 includes a biasing component, e.g. a pad 122, radially outward from sleeve 114. Pad 122 is a shock absorbing material and/or compressible resilient material, such as a rubber sponge or the like. Sleeve 114 includes a radially extending end flange 116 with an end surface 118 that abuts a flange surface 120 of radially extending flange 108 of sensor body 102 to transfer a pre-load to sensor body 102.

With continued reference to FIG. 1, an outer surface 115 of sleeve 114 and an inner surface 150 of bore 110 compress pad 122 radially and restrict pad 122 from expanding in the radial direction. This reduces the possibility of pad 122 impinging upon wires, wire casing or sensor body 102 and causing short-circuits. A second axially facing surface 136 of pad 122 abuts an axially facing outer surface 124 of radially extending end flange 116 of sleeve 114 to apply an axial pre-load to sleeve 114. In turn, the axial pre-load from pad 122 is transferred from end flange 116 to radially extending flange 108 of sensor body 102 to transfer the axial pre-load to sensor body 102 and resist vibratory loads acting on sensor body 102. In other words, sensor retaining system 101 acts to axially pre-load sensor body 102 against a stop surface 148 in bore 110.

With continued reference to FIG. 1, sleeve 114 includes an end 126, opposite from radially extending end flange 116, which extends axially beyond a first end 128 of pad 122. This extension provides a gripping area during removal of sensor body 102 from bore 110 so that the user does not have to grip onto wires 146 or wire casing 144 to get access to sensor body 102, thereby reducing potential stress on wire bundle, e.g. wires 146 and/or wire casing 144. Radially extending end flange 116 of sleeve 114 extends axially beyond a second end 130 of pad 122. System 101 includes an annular member 132, e.g. a washer, radially outward from sleeve 114. Pad 122 includes first and second axially facing surfaces 134 and 136, respectively. First axially facing surface 134 abuts a surface 138 of annular member 132. Pad 122 is compressed between outer axially facing surface 124 of radially extending end flange 116 of sleeve 114 and surface 138 of annular member 132.

As shown in FIG. 1, system 101 includes a retaining member 140, e.g. a snap ring, abutting at least a portion of an axial facing surface 142 of annular member 132 to keep annular member 132 in place with respect to the axial direction, e.g. along a line parallel to longitudinal axis A. End 126 of sleeve 114 extends axially beyond proximal end 104 of sensor body 102 so that sleeve 114 can be gripped to remove pad 122, after retaining member 140 and annular member 132 have been removed, without pulling on wires 146. System 101 includes a wire casing 144 operatively connected to and extending axially from proximal end 104 of sensor body 102 to surround wires 146 extending from proximal end 104 of sensor body 102. Wire casing 144 can be a shrink sleeve, or the like. Wire casing 144 is nested within sleeve 114, between sleeve 114 and proximal end 104 of sensor body 102. At least a portion of wire casing 144 extends axially from first end 126 of sleeve 114. Wires 146 extend from proximal end 104 of sensor body 102. Wire casing 144 is radially outward from and surrounds wires 146.

Figure 2:
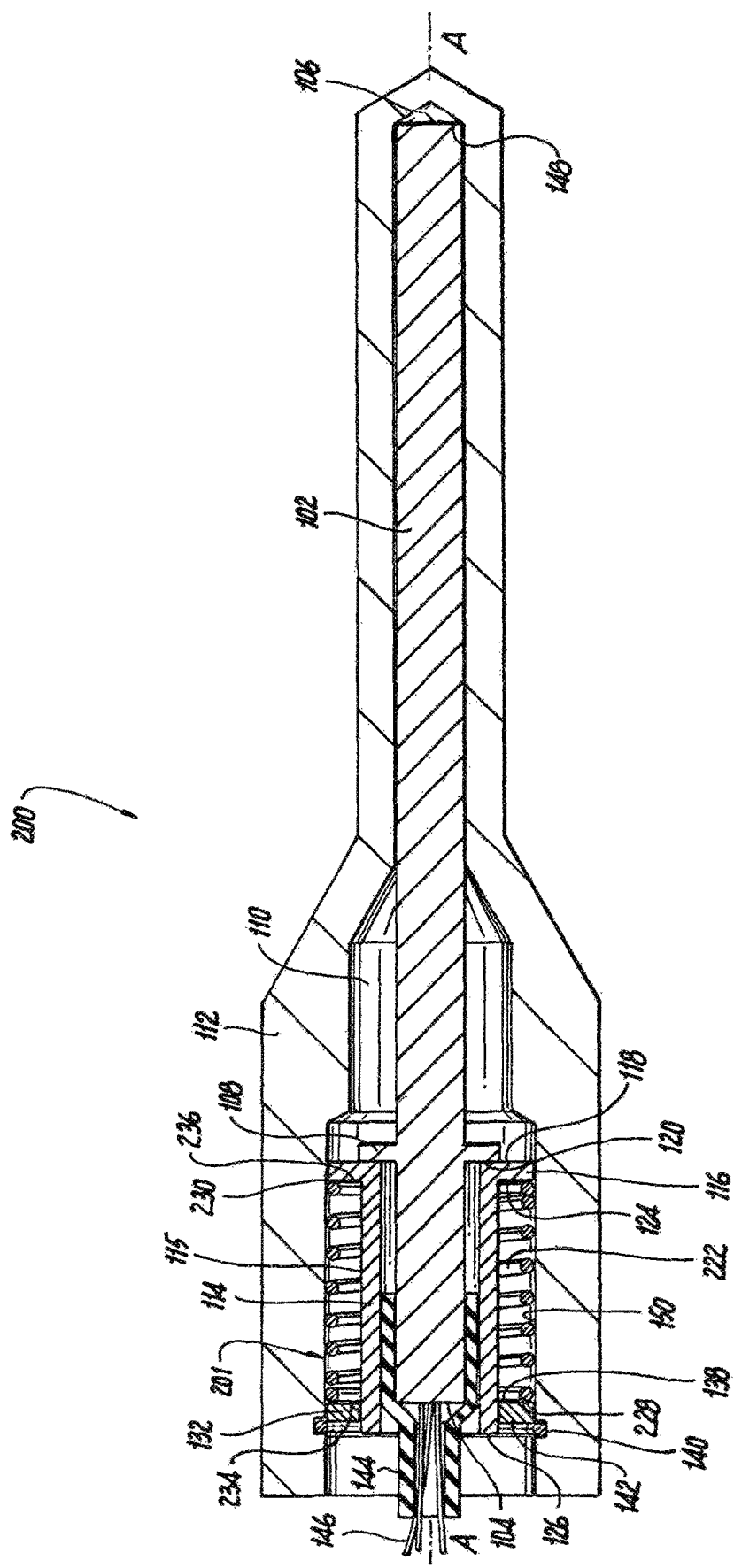
FIG. 2 is a schematic cross-sectional view of another exemplary embodiment of a sensor system constructed in accordance with the present invention, showing a sensor retaining system with a helical spring.

As shown in FIG. 2, a sensor system 200 is similar to system 100 described above. System 200 includes a sensor body 102 similar to the sensor body described above. Sensor body 102 is disposed in a bore 110 formed in a structure 112, such as a turbomachine. Sensor system 200 includes a sensor retaining system 201. Sensor retaining system 201 is similar to sensor retaining system 101 described above, except instead of the biasing component being a pad 122, it is a helical spring 222. Helical spring 222 includes a first axially facing surface 234 and a second axially facing surface 236, similar to first and second axially facing surfaces 134 and 136, respectively. Helical spring 222 includes a first end 228 and a second end 230, similar to first and second ends 128 and 130, respectively. Helical spring 222 operates similarly to pad 122, in that helical spring 222 transfers a pre-load to sensor body 102 through sleeve 114.

A method of disassembling a sensor system, e.g. sensor system 101 or 201, includes axially moving a sleeve, e.g. sleeve 114, where the sleeve axially abuts a portion of a sensor body, e.g. sensor body 102, positioned within a bore, e.g. bore 110, of a housing, e.g. structure 112. The method includes axially removing a biasing member, e.g. biasing members 122 or 222, from the bore with the moving of the sleeve.

The methods and systems as described above and shown in the drawings, provide for a reduction in undue stress placed on wires extending from a sensor body, improved retaining of the sensor body within a bore and increased ease of maintenance and manufacture. While the apparatus and methods described herein have been shown and described with reference to preferred embodiments, those skilled in the art will readily appreciate that changes and/or modifications may be made thereto without departing from the scope of this disclosure.

What is claimed is:

1. A sensor retaining system comprising: a sleeve sized and configured to about a radially extending flange of a sensor body; a biasing component radially outward from the sleeve configured to apply an axial load to the sleeve; an annular member positioned axially between the biasing component and a retaining member; and further comprising a wire casing nested within the sleeve, wherein at least a portion of the wire casing extends axially from a first end of the sleeve and wherein at least a portion of the wire casing is nested between the sleeve and the sensor body.

2. The system as recited in claim 1, wherein the biasing component is at least one of a pad that includes a shock absorbing material, or a helical spring, wherein the biasing component is configured to contact an axially facing outer surface of a radially extending end flange of the sleeve to apply the axial load to the sleeve.

3. The system as recited in claim 1, wherein the sleeve is configured to extend longitudinally beyond the biasing component in both directions when installed in the sensor retaining system.

4. The system as recited in claim 1, wherein the annular member is positioned radially outward from the sleeve.

5. The system as recited in claim 4, wherein the retaining member abuts at least a portion of an axial surface of the annular member to keep the annular member in place in the axial direction.

6. The system as recited in claim 1, wherein the annular member is positioned radially outward from the sleeve, wherein the biasing component includes first and second axially facing surfaces, wherein the first axially facing surface abuts a surface of the annular member.

7. The system as recited in claim 6, wherein the second axially facing surface of the biasing component abuts an outer axially facing surface of a radially extending end flange of the sleeve to apply the axial load to the sleeve.

* * * * *